US 6,656,631 B2

(12) United States Patent
Zayatz et al.

(10) Patent No.: US 6,656,631 B2
(45) Date of Patent: Dec. 2, 2003

(54) BATTERY HOUSING, ELECTRICITY DELIVERING SYSTEM AND METHOD OF DELIVERING ELECTRICITY

(75) Inventors: Robert Zayatz, North Tonawanda, NY (US); Michael David Brown, Lancaster, NY (US)

(73) Assignee: Wilson Greatbatch Ltd., Clarence, NY (US)

( * ) Notice: Subject to any disclaimer, the term of this patent is extended or adjusted under 35 U.S.C. 154(b) by 189 days.

(21) Appl. No.: 09/735,781

(22) Filed: Dec. 13, 2000

(65) Prior Publication Data

US 2002/0071988 A1 Jun. 13, 2002

Related U.S. Application Data

(60) Provisional application No. 60/170,297, filed on Dec. 13, 1999.

(51) Int. Cl.[7] .................. H01M 2/02; H01M 10/44; H01M 10/48; H01M 2/22
(52) U.S. Cl. .................. 429/163; 429/50; 429/90; 429/159; 429/164; 429/99
(58) Field of Search .................. 429/50, 90, 159, 429/163, 164, 96, 99, 100, 175

(56) References Cited

U.S. PATENT DOCUMENTS

| | | | | |
|---|---|---|---|---|
| 3,301,712 A | * | 1/1967 | Bach | 429/100 |
| 3,930,885 A | * | 1/1976 | Dey | 429/116 |
| 4,053,688 A | * | 10/1977 | Perkins et al. | 368/88 |
| 4,207,386 A | * | 6/1980 | Meinhold et al. | 429/104 |
| 4,778,408 A | | 10/1988 | Morrison | 439/522 |
| 5,180,644 A | | 1/1993 | Bresin et al. | |
| 6,224,997 B1 | * | 5/2001 | Papadopoulos | 429/157 |
| 6,303,248 B1 | * | 10/2001 | Peterson | 429/100 |

FOREIGN PATENT DOCUMENTS

EP     1 020 940 A2    7/2000

OTHER PUBLICATIONS

Patent Abstracts of Japan: Publication No. 200021586A; published Aug. 4, 2000.
Drawing titled: *Battery Pack*, drawn by P. Stodolka, dated Jul. 26, 2001.
Patent Abstracts of Japan, Publication Date Mar. 4, 1994; Publication No. 06060863.
Patent Abstracts of Japan, Publication Date Feb. 24, 1981; Publication No. 56019872.

* cited by examiner

*Primary Examiner*—Patrick Ryan
*Assistant Examiner*—Gregg Cantelmo
(74) *Attorney, Agent, or Firm*—Hodgson Russ LLP

(57) ABSTRACT

The present invention includes a housing having a casing and a cap. A connecting conductor is joined to the cap, and a plunger conductor assembly is electrically connected to the connecting conductor. A battery may be placed in the casing and electrically connected to an electrically conductive concentric ring. When the cap is attached to the casing, the plunger conductor is electrically connected with the concentric ring so as to provide electricity from the battery to the connecting conductor. A method of delivering electricity using such a housing is also described.

53 Claims, 8 Drawing Sheets

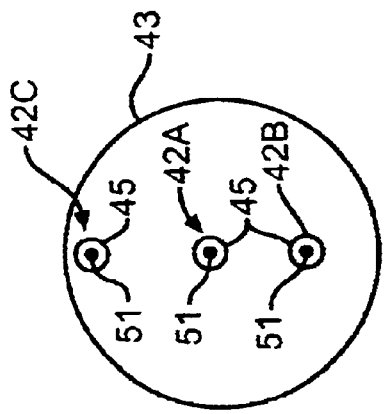
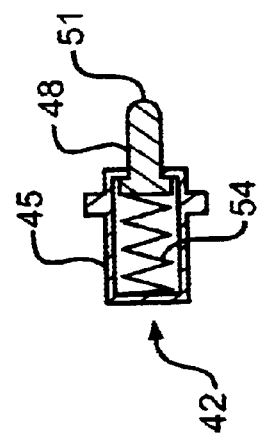
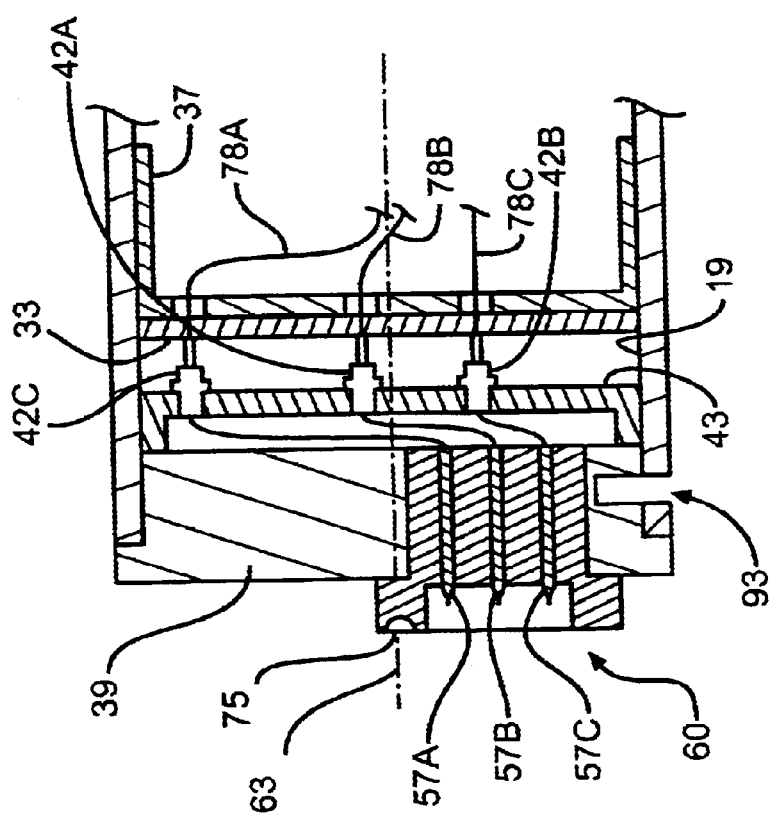

BATTERY HOUSING, ELECTRICITY DELIVERING SYSTEM AND METHOD OF DELIVERING ELECTRICITY

CROSS CLAIM TO RELATED APPLICATION

Priority is hereby claimed to U.S. Provisional Patent Application No. 60/170,297 filed on Dec. 13, 1999, and is hereby incorporated by this reference.

BACKGROUND OF THE INVENTION

1. Field of the Invention

The present invention relates generally to devices and methods of providing electrical energy.

SUMMARY OF THE INVENTION

The present invention includes a housing having a casing and a cap. A connecting conductor is joined to the cap, and a plunger conductor assembly is electrically connected to the connecting conductor.

In a method according to the present invention, a battery is provided in a casing. A contact board having thereon a concentric ring of electrically conductive material is provided. A terminal of the battery is electrically connected to the concentric ring. A cap with a plunger conductor is provided, and the cap is attached to the casing so the plunger conductor is in electrical contact with the concentric ring. A connecting conductor is electrically connected to the plunger conductor, and an electrical pathway from the connecting conductor to an electricity consuming device is provided. Then, electricity is allowed to flow from the battery to the electricity consuming device via the concentric ring, the plunger conductor and the connecting conductor.

BRIEF DESCRIPTION OF THE DRAWINGS

For a fuller understanding of the nature and objects of the invention, reference should be made to the following detailed description taken in conjunction with the accompanying drawings, in which:

FIG. 4A is an enlarged partially cross-sectioned side view of an end of the system shown in FIG. 1;

FIG. 4B depicts a plunger conductor substrate with plunger conductors mounted thereon according to the present invention;

FIG. 5 is a partially cross-sectioned side view of a plunger conductor according to the present invention;

BEST MODE FOR CARRYING OUT THE INVENTION

Figure 7:
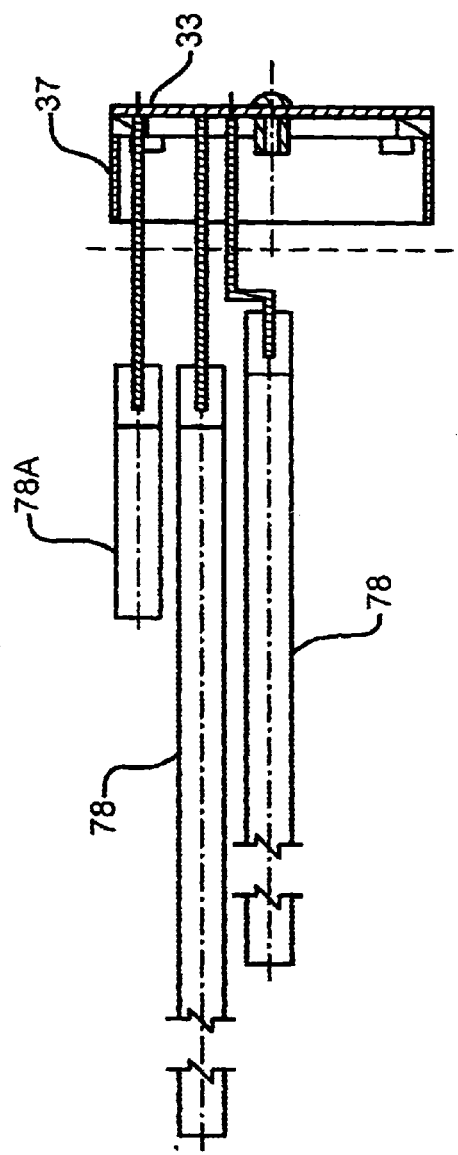
FIG. 7 is a cross-sectioned view of the contact board shown in FIG. 2 taken along the line 7—7.
Figure 8:
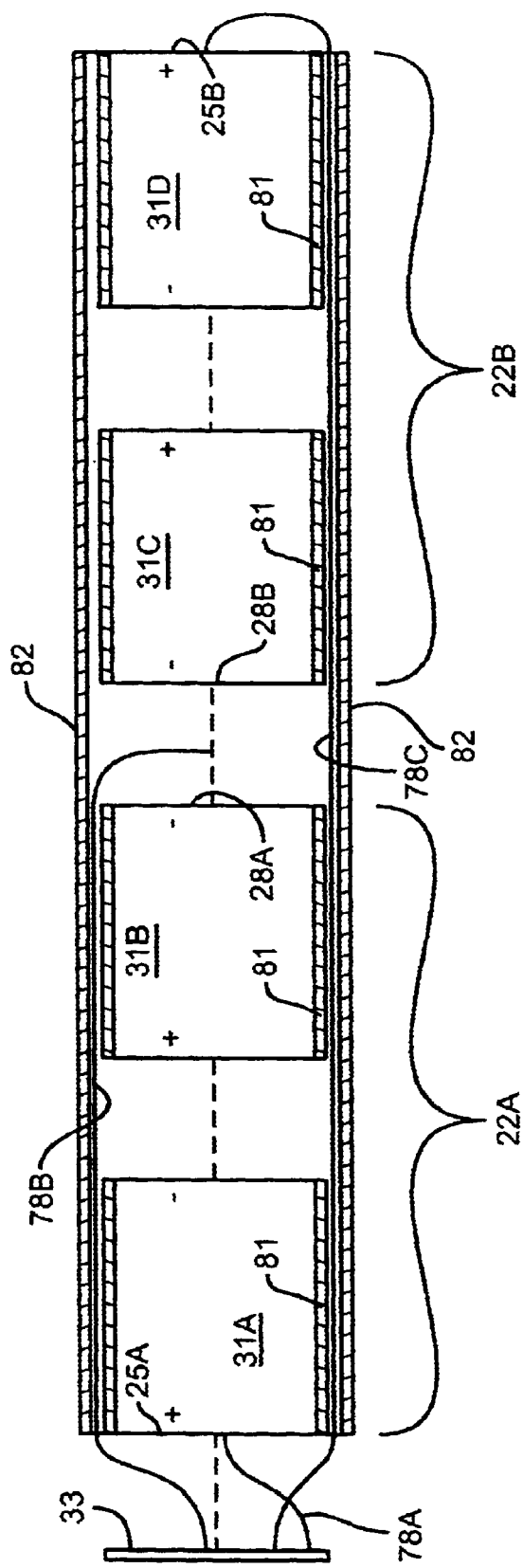
FIG. 8 is a partially cross-sectioned, exploded side view of two batteries, each having two cells, and a contact board according to the present invention.

FIGS. 1–8 depict an electricity delivering system 10 according to the present invention. The system 10 has a casing 13 having a wall 16 defining a cavity 19. The casing 13 may be made from fiberglass. The casing 13 may be substantially cylindrical. The system 10 also includes one or more batteries 22 in the cavity 19, each battery 22 having a positive terminal 25 and a negative terminal 28. A battery 22 may be comprised of more than one cell. For example, the battery 22 may be comprised of cells 31A, 31B, 31C and 31D. As shown in FIG. 8, a first battery 22A includes a first cell 31A and a second cell 31B. A second battery 22B includes a third cell 31C and a fourth cell 31D.

The system 10 has a contact board 33 (best seen in FIG. 2) that includes at least two concentric rings of electrically conductive material, for example there may be three rings 36A, 3GB and 36C. A first one of the concentric rings is electrically connected to the positive terminal 25 of the battery 22A. A second one of the concentric rings is electrically connected to the negative terminal 28 of the battery 22A. The contact board 33 may be attached to a spacer 37, a portion of which is held between the casing 13 and one or more of the cells 31.

The system also has a cap 39 (FIGS. 1 and 3, and as later described, FIGS. 10A and 10B) attached to the casing 13. The cap 39 may be made from a hydrophobic material, such as Delrin™, to reduce the amount of water absorbed by or through the cap 39. The cap 39 may include one or more substantially flat surfaces 40. The flat surfaces 40 reduce the need to dimensionally control the entire surface area to a close tolerance during molding, thereby reducing mold costs and also thereby enabling the cap 39 to be more easily mated to the casing 13 by allowing for an out-of-round condition in the cap 39 or casing 13, or both.

Mounted to the cap 39 is a first plunger conductor 42A and a second plunger conductor 42B. The plunger conductors 42 may be mounted on a plunger conductor substrate 43, and the plunger conductor substrate 43 may be attached to the cap 39. A plunger conductor substrate 43 with three plunger conductors 42A, 42B, 42C is shown in FIGS. 4A and 4B. The first plunger conductor 42A is positioned to engage the first concentric ring 36A when the cap 39 is attached to the casing 13, and the second plunger conductor 42B is positioned to engage the second concentric ring 36B when the cap 39 is attached to the casing 13. Either of the plunger conductors 42A, 42B may include a base 45 attached to the plunger conductor substrate 43. See FIGS. 4 and 5. Extending from the base 45 is a movable extension 48. One such plunger conductor 42 is part number 100410-05 manufactured by Interconnect Device Incorporated located in Kansas City, Kans. A tip 51 of the movable extension 48 may be moved closer to the base 45 by exerting a force on the tip 51 in the direction of the base 45. In one embodiment, the movable extension 48 is biased away from the base 45 by a spring 54 residing between the base 45 and the movable extension 48. The spring 54 may be electrically conductive and connected to the base 45 and the movable extension 48.

A first connecting conductor 57A is shown electrically connected to the third plunger conductor 42C, and a second connecting conductor 57B is shown electrically connected to the first plunger conductor 42A. Either or both of the connecting conductors 57A, 57B may extend through the cap 39. Either of both of the connecting conductors 57A, 57B may be part of a plug 60 on the cap 39. The plug 60 and connecting conductors 57 may be provided by using a Fischer connector, part number DEU104A065-139 manufactured by Fischer Connectors located in Atlanta, Ga. In one embodiment of the present invention, a center axis 63 of the casing 13 does not pass through an area 66 between the first connecting conductor 57A and the second connecting conductor 57B. See FIG. 3.

Figure 1:
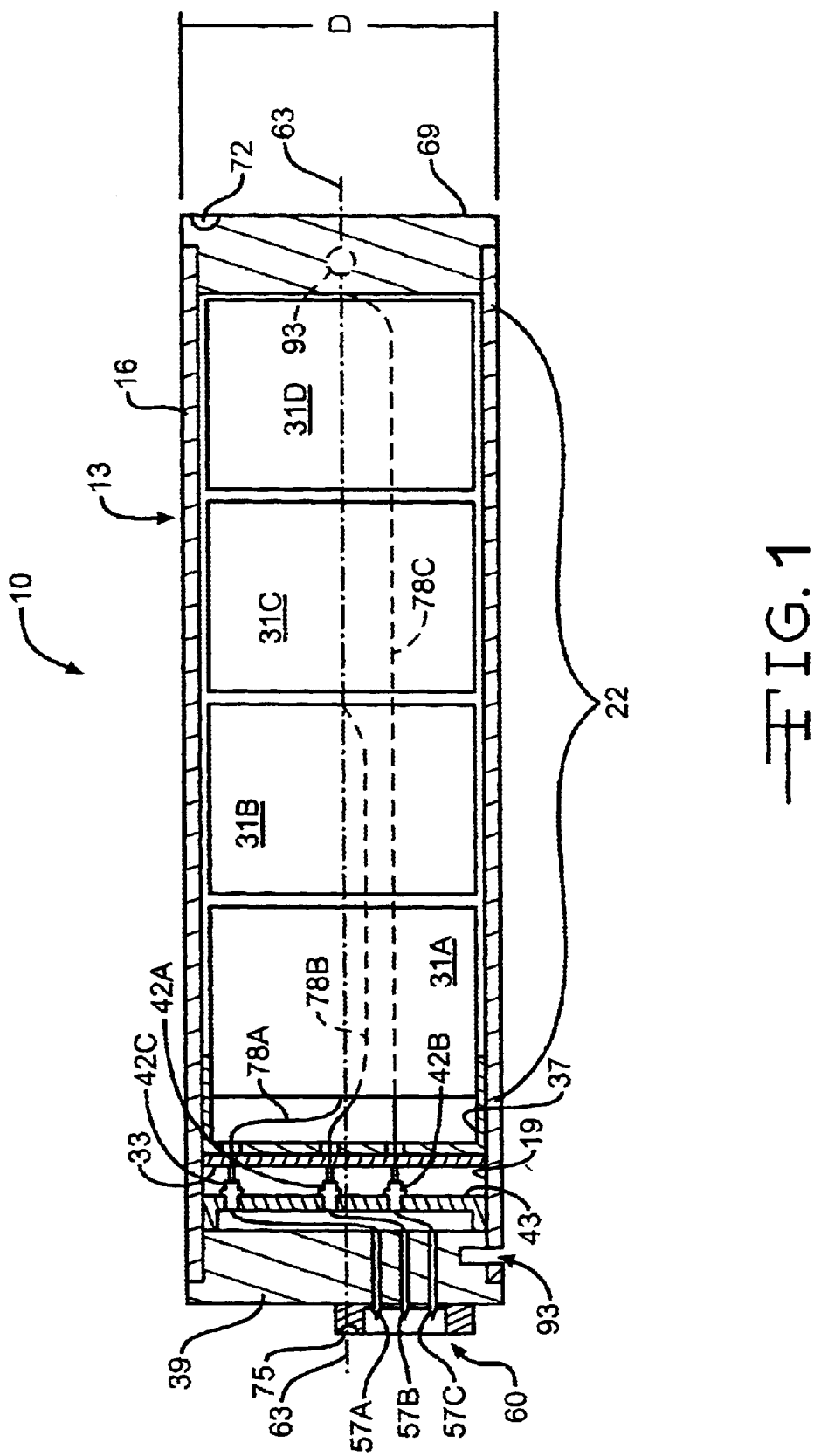
FIG. 1 is a partially cross-sectioned side view of a system according to the present invention.
Figure 2:
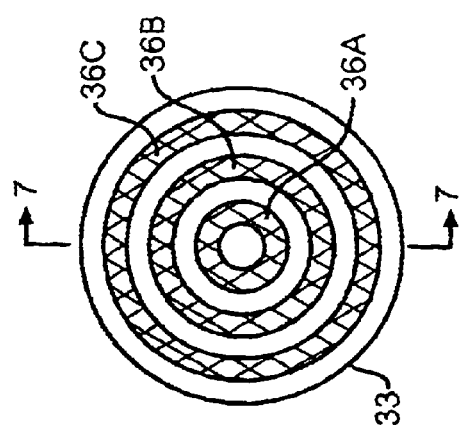
FIG. 2 is a front view of a contact board according to the present invention.
Figure 3:
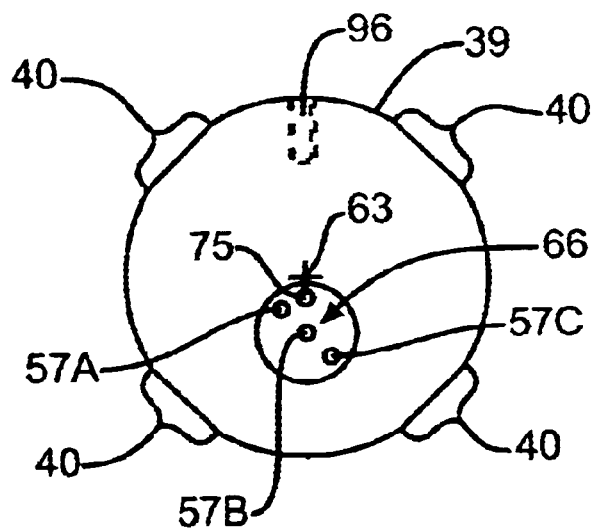
FIG. 3 is a front view of a cap according to the present invention.
Figure 6:
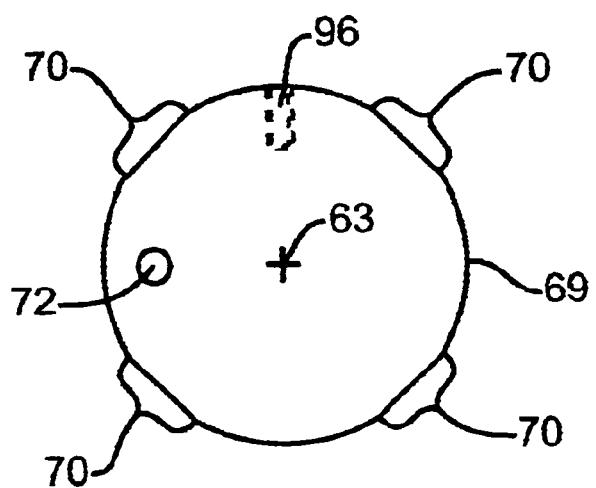
FIG. 6 is a is a front view of an end cover according to the present invention.

The embodiment of the present invention shown in FIGS. 1, 3 and 4 has three connecting conductors 57, but the present invention is not limited to three connecting conductors 57. More or fewer connecting conductors 57 may be included to accommodate any number of batteries 22 or to provide more than one electrical path from a concentric ring 36. For example, the embodiment shown in FIGS. 1, 3 and 4 may have six connecting conductors 57, two for each concentric ring 36 so that if the electrical path from a concentric ring created by one plunger conductor 42 and connecting conductor 57 is cut or there is a short in that electrical path, there will still be an electrical path from that concentric ring 36 to a connecting conductor 57. Furthermore, the connecting conductors 57 may be arranged to accommodate a mating plug, and so the diagonal arrangement depicted in FIG. 3 need not be used.

Figure 11:
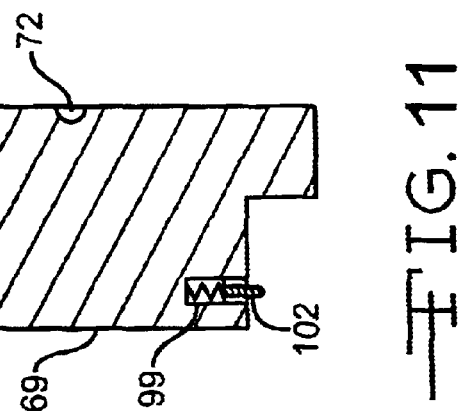
FIG. 11 is a partially cross-sectioned side view of an alternative embodiment of the end cover according to the present invention.

The system may further include an end cover 69 (see FIGS. 1 and 6, and as later described, FIG. 11) attached to the casing 13. The end cover 69 may be made from a hydrophobic material, such as Delrin™, to reduce the amount of water absorbed by or through the end cover 69. The end cover 69 may include one or more substantially flat surfaces 70. The flat surfaces 70 reduce the need to dimensionally control the entire surface area to a close tolerance during molding, thereby reducing mold costs and also thereby enabling the end cover 69 to be more easily mated to the casing 13 by allowing for an out-of-round condition in the end cover 69 or the casing 13, or both.

The end cover 69 includes an indicator 72 thereon for indicating a position of the connecting conductors 57. The cap 39 and or the plug 60 may include an indicia 75 for indicating a position of the connecting conductors 57. The indicia 75 on the cap 39 may be used to assist in properly orienting the indicator 72 on the end cover 69. The indica 75 may be different in color from a color of the cap 39 or plug 60, as the case may be, or the indicia 75 may be an indentation or raised area on the cap 39 or plug 60, as the case may be. In this manner, a person need only look at the indicator 72 on the end cover 69 to determine the position of the connecting conductors 57 on the cap 39. For example, when the connecting conductors 57 are not visible, but the end cover 69 is visible, the position of the connecting conductors 57 is easily determined by noting the position of the indicator 72. The indicator 72 may be different in color from a color of the end cover 69, or the indicator 72 may be an indentation or raised area on the end cover 69.

The system 10 may further include a cell-ring conductor 78 (see FIGS. 7 and 8). A first end of the cell-ring conductor 78 may be electrically connected to one of the concentric rings 36. A second end of the cell-ring conductor 78 may be electrically connected to one of the terminals 25, 28. For example, one such cell-ring conductor 78A may be used to electrically connect a positive terminal 25A of the battery 22A to one of the concentric rings 36C. Another such cell-ring conductor 78B may be used to electrically connect a negative terminal 28A of the battery 22A to one of the concentric rings 36A. One or more of the cell-ring conductors 78 may have a rectangular cross section to minimize the diameter D of the system 10.

The system 10 may also include a first electrically insulating wrap 81 surrounding at least part of the battery 22. The first insulating wrap 81 may be made from polyvinyl chloride. When combined with the cell-ring conductor 78, the battery 22 is insulated from the cell-ring conductor 78 by the first insulating wrap 81. A second electrically insulating wrap 82 may surround the battery 22 and the cell-ring conductor 78 to insulate the battery and the cell-ring conductor from, for example, the casing 13 and to allow for easy insertion and removal of a multi-cell battery or more than one battery as a single unit.

In one embodiment of the present invention, the system 10 includes four cells 31, each having a positive terminal and a negative terminal. The positive terminals are indicated in FIG. 8 by a "+" and the negative terminals are indicated by a "−". The contact board 33 has three concentric rings 36 of electrically conductive material. A first one of the concentric rings 36A is electrically connected to the negative terminals of the second cell 31B and third cell 31C. A second one of the concentric rings 36B is electrically connected to the positive terminal of the fourth cell 31D. A third one of the concentric rings 36C is electrically connected to the positive terminal of the first cell 31A. Cell-ring conductors 78, as described above, may be used to connect the terminals to the concentric rings 36. In the embodiment shown, the cap 39 has three plunger conductors 42 mounted on the cap 39. Each plunger conductor 42 is positioned to engage a different one of the concentric rings 36. In addition, this embodiment has three connecting conductors 57, each electrically connected to a different plunger conductor 42. Each of the connecting conductors 57 may extend through the cap 39, and the connecting conductors 57 may be part of a plug 60 on the cap 39.

When four cells are provided as described in the immediately preceding paragraph, the negative terminal of the second cell 31B may be positioned proximate to the negative terminal of the third cell 31C. In this embodiment, one of the batteries 22A or 22B may be used to provide electricity via two of the connecting conductors 57 at any particular time, simply by choosing which of the concentric rings 36 are used.

Figure 9:
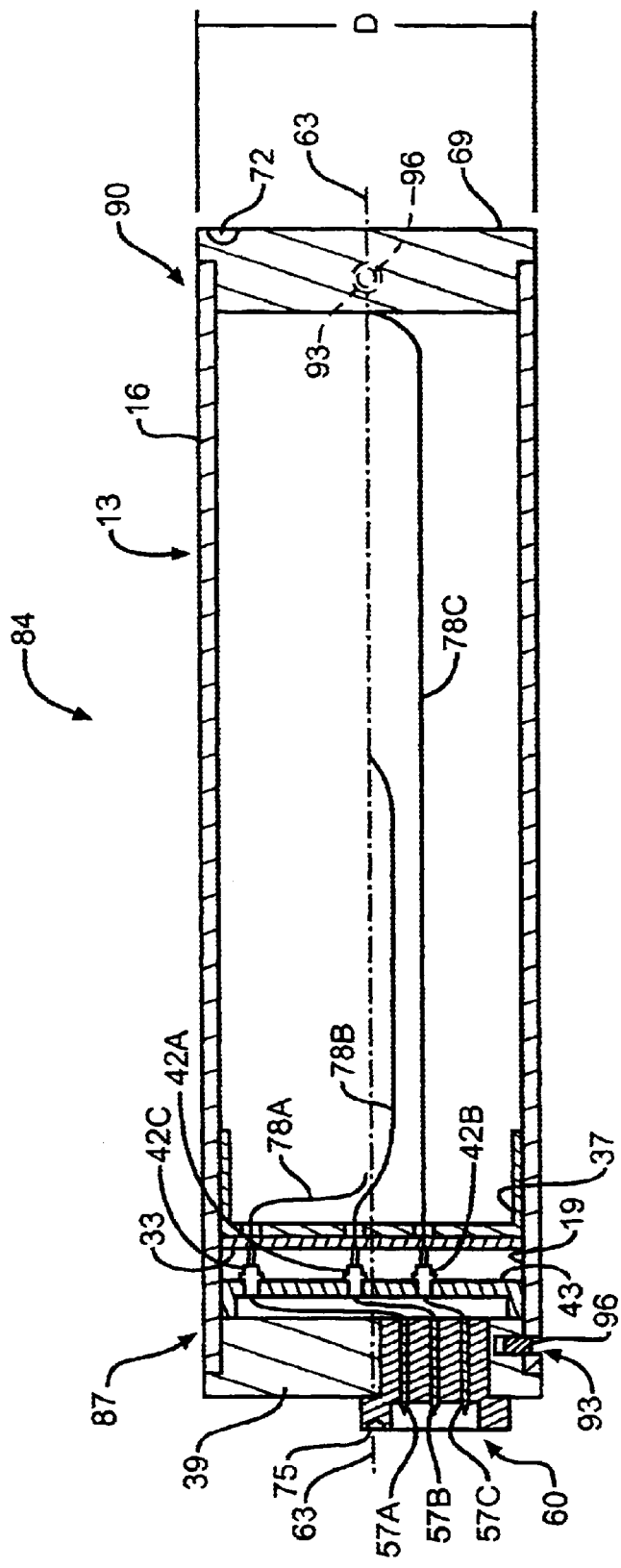
FIG. 9 is partially cross-sectioned side view of a battery housing according to the present invention.

FIG. 9 shows a battery housing 84 according to the present invention. Features in FIG. 9 that are similar to features in FIGS. 1–8 have the same feature number. One such battery housing 84 includes a casing 13 having first end 87 and a second end 90. The first end 87 and the second end 90 each have an orifice 93 through a wall 16 of the casing 13. The casing 13 may be substantially cylindrical.

The housing 84 includes a cap 39 having a movable pin 96 for selectively extending through the orifice 93 at the first end 87 of the casing 13. The housing 84 also includes an end cover 69 having a movable pin 96 for selectively extending through the orifice 93 at the second end 90 of the casing 13. One or more of the movable pins 96 may be threaded to engaged corresponding threads in the cap 39 or the end cover 69, or both. In addition, one or more of the movable pins 96 may be made from a non-magnetic material such as Delrin™, nylon, brass or non-magnetic stainless steel. When the cap 39 or end cover 69, as the case may be, are inserted into the casing 13, the movable pin 96 is aligned with the orifice 93 in the casing 13, and when the movable pin 96 is threaded the pin 96 is rotated until the pin 96 extends into the orifice 93. The movable pin 96 may be provided with a notch for accommodating a tool, such as a screw driver or Allen wrench, that may be used to rotate the movable pin 96.

Figure 10B:
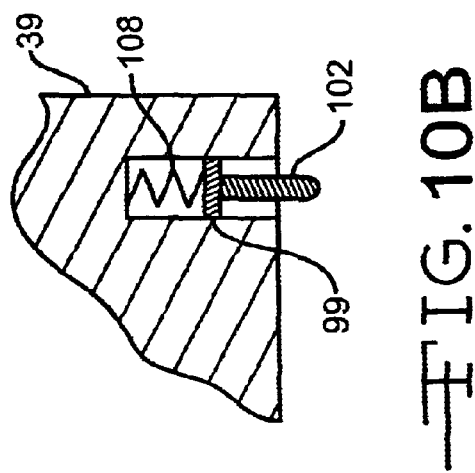
FIG. 10B is a cross-sectioned side view of an alternative embodiment of a biased extension according to the present invention.
Figure 10A:
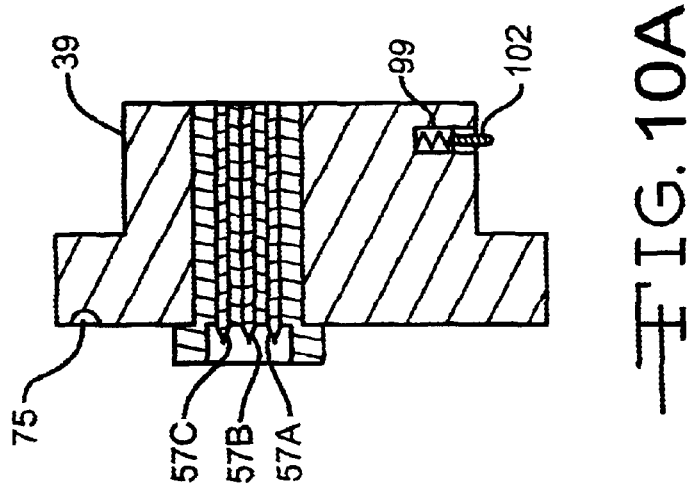
FIG. 10A is a partially cross-sectioned side view of an alternative embodiment of the cap according to the present invention.

In another embodiment, shown in FIG. 10A, a base 99 is fixed in the cap 39 or the end cover 69, as the case may be, and a biased extension 102 extending from the base 99. The biased extension 102 is selectively moved toward the base to allow the cap 39 or end cover 69, as the case may be, to be inserted into the casing 13. A spring 105 may be used to bias the biased extension 102 away from the base 99. When the cap 39 or end cover 69 is in the casing 13, the biased extension 102 moves away from the base 99 to extend into the orifice 93 in the casing 13. The base 99, the biased extension 102 and the spring 105 may be made from a non-magnetic material such as non-magnetic stainless steel. One such movable pin 96 having a base 99 and a biased extension 102 is part number SSM55N, manufactured by Vlier located in Burbank, Calif. As shown in FIG. 10B, the base 99 may be a modified set screw. In addition, the spring 105 may be replaced by a resilient compressible pad 108. The compressible pad 108 may be made from rubber, for example.

A connecting conductor 57 may be joined to the cap 39, and a plunger conductor 42 is electrically connected to the connecting conductor 57. The plunger conductor 42 has a movable extension 48 and a base 45. The movable extension 48 is biased to extend from the base 45. The plunger conductor 42 may include an electrically conductive spring 54, electrically connected to the movable extension 48 and the base 45. In one embodiment of the present invention, the connecting conductor 57 extends through the cap 39. The connecting conductor 57 may be part of a plug 60. The connecting conductor 57 may be positioned such that a center axis 63 of the casing 13 does not pass through an area 66 between the connecting conductors 57.

The battery housing 84 may include an indicator 72 on the end cover 69 indicating a position of the connecting conductors 57. The cap 39 or the plug 60 may include an indicia 75 for indicating a position of the connecting conductors 57. The indicator 72 or the indicia 75, or both, may be different in color from a color of the cap 39, end cover 69 or the plug 60, as the case may be. The indicator 72 or the indicia 75, or both, may be an indentation or raised area on the cap 39, end cover 69 or the plug 60, as the case may be.

The battery housing 84 may further have a contact board 33 having thereon a concentric ring 36 of electrically conductive material. The concentric ring 36 is positioned on the contact board 33 such that when the contact board 33 and the cap 39 are installed in the casing 13, the plunger conductor 42 is electrically connected to the concentric ring 36. The housing 84 may also include cell-ring conductor 78, and the cell-ring conductor 78 may have a substantially rectangular cross-section. A first end of the cell-ring conductor 78 is electrically connected to the concentric ring 36.

Figure 12:
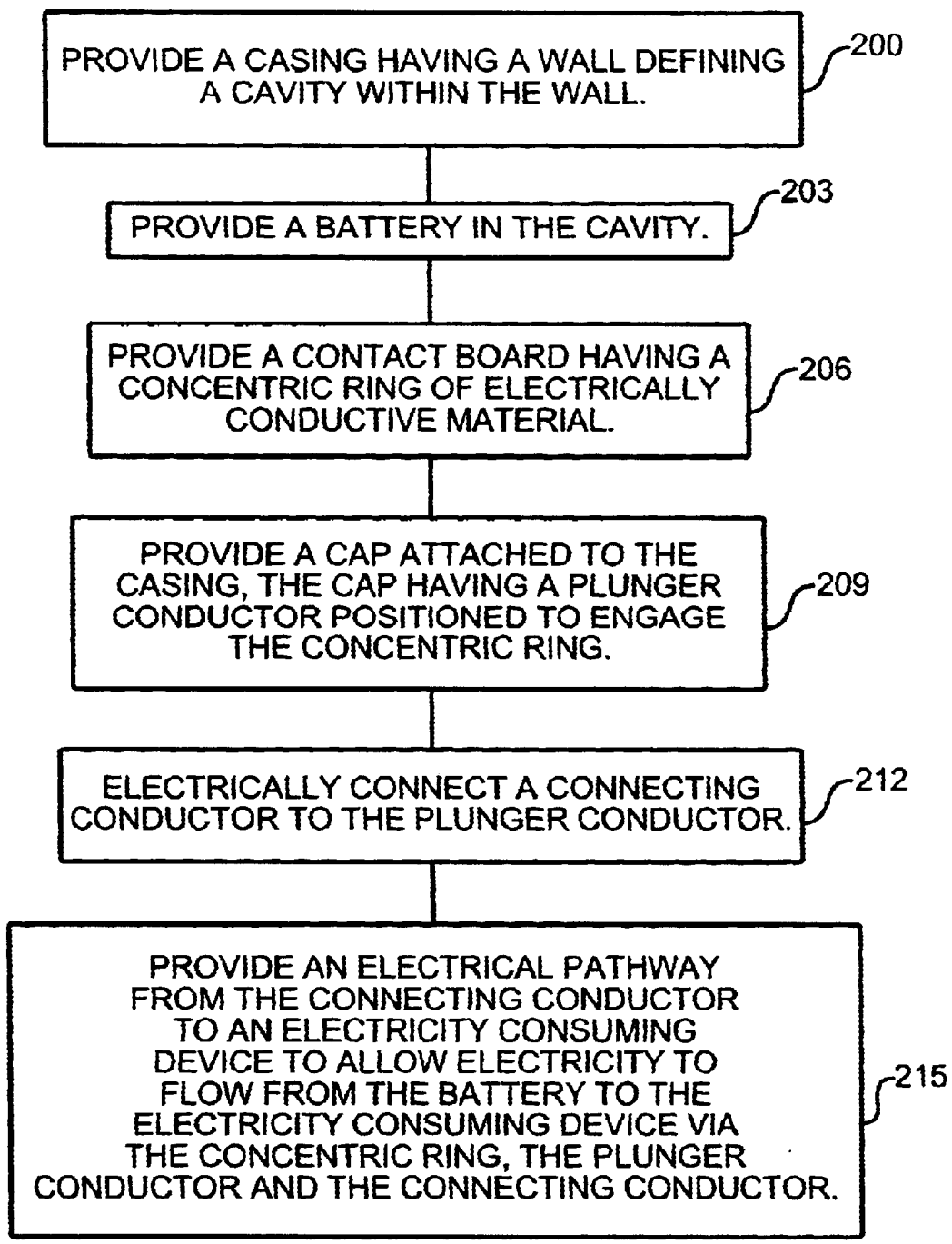
FIG. 12 depicts a method according to the present invention.

FIG. 12 depicts a method according to the present invention. In the method, electricity is supplied by providing 200 a casing having a wall defining a cavity within the wall. A battery is provided 203 in the cavity. The battery has a positive terminal. A contact board is provided 206 that has a concentric ring of electrically conductive material, the concentric ring being electrically connected to the positive terminal. A cap is provided 209 and attached to the casing. The cap has mounted thereon a plunger conductor that is positioned to engage the concentric ring when the cap is attached to the casing. A connecting conductor is electrically connected 212 to the plunger conductor and an electrical pathway is provided 215 from the connecting conductor to an electricity consuming device. Once the electrical pathway is provided, electricity is allowed to flow from the battery to the electricity consuming device via the concentric ring, the plunger conductor and the connecting conductor.

Although the present invention has been described with respect to one or more particular embodiments, it will be understood that other embodiments of the present invention may be made without departing from the spirit and scope of the present invention. Hence, the present invention is deemed limited only by the appended claims and the reasonable interpretation thereof.

What is claimed is:

1. An electricity delivering system, comprising:
   a casing having a wall defining a cavity within the wall;
   a battery in the cavity and having a positive terminal and a negative terminal;
   a contact board having thereon two concentric rings of electrically conductive material, a first of the concentric rings being electrically connected to the positive terminal, and a second of the concentric rings being electrically connected to the negative terminal;
   a cap attached to the casing and having mounted thereon a first plunger conductor and a second plunger conductor, the first plunger conductor being positioned to engage the first concentric ring, and the second plunger conductor being positioned to engage the second concentric ring;
   a first connecting conductor electrically connected to the first plunger conductor; and
   a second connecting conductor electrically connected to the second plunger conductor.

2. The system of claim 1, wherein the casing is substantially cylindrical.

3. The system of claim 1, wherein the battery includes two cells.

4. The system of claim 1, wherein any of the plunger conductors include a base and a movable extension biased to extend from the base.

5. The system of claim 4, wherein any of the plunger conductors include an electrically conductive spring electrically connected to the base and the extension.

6. The system of claim 1, wherein the first connecting conductor extends through the cap.

7. The system of claim 1, wherein the first connecting conductor and the second connecting conductor are part of a plug on the cap.

8. The system of claim 7, wherein the plug includes an indicia thereon for indicating a position of the connecting conductors.

9. The system of claim 8, wherein the indicia is a material different in color from a color of the plug.

10. The system of claim 1, wherein a center axis of the casing does not pass through an area between the first connecting conductor and the second connecting conductor.

11. The system of claim 10, further comprising an end cover attached to the casing and having an indicator thereon for indicating a position of the connecting conductors.

12. The system of claim 11, wherein the cap includes an indicia thereon for indicating a position of the connecting conductors.

13. The system of claim 11, wherein the indicator is a material different in color from a color of the end cover.

14. The system of claim 1, further comprising a cell-ring conductor having a substantially rectangular cross-section, a first end and a second end, the first end of the cell-ring conductor being electrically connected to one of the concentric rings, and the second end of the cell-ring conductor being electrically connected to one of the terminals.

15. The system of claim 1, further comprising a first electrically insulating wrap surrounding at least part of the battery.

16. The system of claim 15, wherein the first electrically insulating wrap resides between the at least part of the battery and at least part of one of the connecting conductors.

17. The system of claim 16, further comprising a second electrically insulating wrap surrounding the at least part of the battery and the at least part of one of the connecting conductors.

18. The system of claim 15, wherein the electrically insulating wrap includes polyvinyl chloride.

19. The system of claim 15, wherein the first electrically insulating wrap surrounds at least part of the battery and at least part of one of the connecting conductors.

20. An electricity delivering system, comprising:
a casing having a wall defining a cavity within the wall;
a first battery in the cavity, the first battery having a positive terminal and a negative terminal;
a second battery in the cavity, the second battery having a positive terminal and a negative terminal, the negative terminal of the second battery being electrically connected to the negative terminal of the first battery;
a contact board having thereon three concentric rings of electrically conductive material, a first of the concentric rings being electrically connected to the positive terminal of the first battery, and a second of the concentric rings being electrically connected to the positive terminal of the second battery, and a third of the concentric rings being electrically connected to the negative terminals of the first battery and the second battery;
a cap attached to the casing and having mounted thereon a first plunger conductor, a second plunger conductor, and a third plunger conductor, the first plunger conductor being positioned to engage the first concentric ring, and the second plunger conductor being positioned to engage the second concentric ring, and the third plunger conductor being positioned to engage the third concentric ring;
a first connecting conductor electrically connected to the first plunger conductor;
a second connecting conductor electrically connected to the second plunger conductor; and
a third connecting conductor electrically connected to the third plunger conductor.

21. The system of claim 20, wherein the casing is substantially cylindrical.

22. The system of claim 20, wherein any of the plunger conductors include a base and a movable extension biased to extend from the base.

23. The system of claim 22, wherein any of the plunger conductors include an electrically conductive spring electrically connected to the base and the extension.

24. The system of claim 20, wherein the first connecting conductor extends through the cap.

25. The system of claim 20, wherein the first connecting conductor and the second connecting conductor are part of a plug on the cap.

26. The system of claim 25, wherein the plug includes an indicia thereon for indicating a position of the connecting conductors.

27. The system of claim 26, wherein the indicia is a material different in color from a color of the plug.

28. The system of claim 25, wherein a center axis of the casing does not pass through an area between the first connecting conductor and the second connecting conductor.

29. The system of claim 20, further comprising an end cover attached to the casing and having an indicator thereon for indicating a position of the connecting conductors.

30. The system of claim 29, wherein the cap includes an indicia thereon for indicating a position of the connecting conductors.

31. The system of claim 29, wherein the indicator is a material different in color from a color of the end cover.

32. The system of claim 20, wherein the negative terminal of the first battery is proximate to the negative terminal of the second battery.

33. The system of claim 20, wherein the first battery includes two cells.

34. The system of claim 33, wherein the second battery includes two cells.

35. The system of claim 20, further comprising a cell-ring conductor having a substantially rectangular cross-section, a first end and a second end, the first end of the cell-ring conductor being electrically connected to one of the concentric rings, and the second end of the cell-ring conductor being electrically connected to one of the battery terminals.

36. The system of claim 20, further comprising a first electrically insulating wrap surrounding at least part of one of the cells.

37. The system of claim 36, wherein the first electrically insulating wrap resides between the at least part of one of the cells and at least part of one of the connecting conductors.

38. The system of claim 37, further comprising a second electrically insulating wrap surrounding the at least part of one of the cells and the at least part of one of the connecting conductors.

39. The system of claim 36, wherein the electrically insulating wrap includes polyvinyl chloride.

40. The system of claim 36, wherein the first electrically insulating wrap surrounds at least part of one of the cells and at least part of one of the connecting conductors.

41. A battery housing, comprising:
a casing having a surrounding sidewall extending along a longitudinal axis to a first open end and a second open end of the casing, and having an orifice in the casing sidewall proximate the first open end;
a cap having a movable pin, wherein the cap is positionable in the first open end of the casing with the movable pin extending through the orifice to secure the cap to the casing;
a connecting conductor supported by the cap; and
a plunger conductor electrically connected to the connecting conductor, the plunger conductor having a base and a movable extension, wherein the movable extension is biasable into electrical communication with a terminal of a battery housed in the casing.

42. The battery housing of claim 41, wherein the casing is substantially cylindrical.

43. The battery housing of claim 41, wherein the plunger conductor includes an electrically conductive spring, electrically connected to the movable extension and the base.

44. The battery housing of claim 41, wherein the connecting conductor extends through the cap.

45. The battery housing of claim 41, wherein the connecting conductor includes a plug.

46. The battery housing of claim 45, further comprising another connecting conductor, and wherein a center axis of the casing does not pass through an area between the connecting conductors.

47. The battery housing of claim 41, further comprising an indicator on the cap indicating a position of the connecting conductor.

48. The battery housing of claim 41, further comprising an end cover having a movable pin for selectively extending through the orifice at the second end of the casing.

49. The battery housing of claim 48, wherein the end cover includes an indicia thereon for indicating a position of the connecting conductor.

50. The battery housing of claim 49, wherein the indicia is a material different in color from a color of the end cover.

51. The battery housing of claim 41, further comprising a contact board having thereon a ring of electrically conductive material, the ring being positioned on the contact board such that when the contact board and the cap are installed in the casing the plunger conductor is electrically connected to the ring.

52. The battery housing of claim 51, further comprising a cell-ring conductor having a substantially rectangular cross-section, a first end and a second end, the first end of the cell-ring conductor being electrically connected to the ring.

53. A method of delivering electricity, comprising:

provinding a casing having a wall defining a cavity within the wall;

providing a battery in the cavity, the battery having a positive terminal and a negative terminal;

providing a contact board having thereon two concentric rings of electrically conductive material, the first ring being electrically connected to the positive terminal and the second ring being electrically connected to the negative terminal;

providing a cap attached to the casing, the cap having mounted thereon a first plunger conductor and a second plunger conductor, the first plunger conductor being positioned to engage the first ring and the second plunger conductor being positioned to engage the second ring when the cap is attached to the casing;

providing a first connecting conductor electrically connected to the first plunger conductor;

providing a second connecting conductor electrically connected to the second plunger conductor; and providing electrical pathways from the connecting conductors to an electricity consuming device to allow electricity to flow from the battery to the electricity consuming device via the first ring, the first plunger conductor and the first connecting conductor.

\* \* \* \* \*

UNITED STATES PATENT AND TRADEMARK OFFICE
CERTIFICATE OF CORRECTION

PATENT NO. : 6,656,631 B2
DATED : December 2, 2003
INVENTOR(S) : Robert Zayatz et al.

It is certified that error appears in the above-identified patent and that said Letters Patent is hereby corrected as shown below:

Title page,
Item [*] Notice, should read -- Subject to any disclaimer, the term of this patent is extended or adjusted under 35 U.S.C. 154(b) by 128 days. --.

Signed and Sealed this

Tenth Day of August, 2004

JON W. DUDAS
*Acting Director of the United States Patent and Trademark Office*